UNITED STATES PATENT OFFICE

RALPH B. PAYNE, OF ELMA, NEW YORK, ASSIGNOR TO NATIONAL ANILINE & CHEMICAL CO. INC., OF NEW YORK, N. Y., A CORPORATION OF NEW YORK

PRODUCTION OF AZO DYE

No Drawing.    Application filed July 18, 1929. Serial No. 379,331.

This invention relates to the production of valuable new trisazo dyestuffs which are particularly suitable for dyeing cotton and other vegetable fibres. Material dyed with the new dyestuffs also forms a part of the present invention.

An object of the invention is to provide dyestuffs which dye cotton and other vegetable fibres directly, or by development on the fibre by means of diazotization and treatment with an aromatic diamine or other suitable reagent.

Another object of the invention is to produce a new brown dyestuff.

A further object of the invention is to provide dyestuffs which possess the property of fastness to washing and to light.

Other objects of the invention will appear from the description given below.

The invention accordingly comprises the products possessing the features, properties and the relation of elements, which are exemplified in the following detailed disclosure, and the scope of the application of which will be indicated in the claims.

The new trisazo dyestuffs of the present invention can be obtained by coupling one molecular proportion of a diazotized monoacylated meta-diamine sulfonic acid of the benzene series with one molecular proportion of a primary amine of the benzene or naphthalene series which is free from a hydroxyl or a sulfo group but may contain other substituents, particularly alkyl and/or alkoxy groups, eliminating the acyl group from the resulting monazo dye and tetrazotizing the monazo dye thus obtained and coupling it with two molecular proportions of a meta-diamine of the benzene series, e. g., m-phenylenediamine or m-toluylenediamine.

The new trisazo dyestuffs of the present invention are salts of an acid having the following probable formula:

in which R and R' each represents a hydrogen atom or an alkyl group, e. g. $CH_3$, $C_2H_5$, $C_3H_7$, $C_4H_9$, $C_5H_{11}$, etc., but R and R' may denote the same or different substituents, and R'' signifies a benzene or naphthalene nucleus which may contain alkyl and/or alkoxy groups as substituents but is otherwise free from substituents.

In the dry and pulverized state and in the form of their sodium salts, these dyestuffs are brown powders soluble in water and upon reduction with stannous chloride and hydrochloric acid, they yield a triamine of the benzene series, a diamine of the benzene or naphthalene series, and a diamino sulfonic acid of the benzene series. They dye cotton various shades of brown which are of good fastness to light and washing. They may be developed on the fibre by diazotization and treatment with a suitable developing agent such as, for example, m-phenylenediamine, m-toluylenediamine, beta-naphthol, or phenylmethylpyrazolone, etc., giving various brown shades which are somewhat faster to washing. They may be used as direct or as developed dyestuffs.

The following example will further illustrate the invention, but it will be understood that the invention is not limited thereto. The parts are by weight.

*Example.*—52 parts of oxalyl-m-phenylenediamine sulfonic acid, dissolved in 1000 parts water with the aid of caustic soda, and to which ice is added, are diazotized at 0° C. with 58 parts of hydrochloric acid, sp. gr. 1.16, and 13.8 parts sodium nitrite. To the cold diazo solution, cooled to 0° C. by addition of ice, there is added, with stirring, a solution of 31.6 parts of 1-naphthylamine in 300 parts of water containing 28 parts of hydrochloric acid, sp. gr. 1.16, followed by the addition of sufficient sodium acetate to neutralize the mineral acidity of the reaction

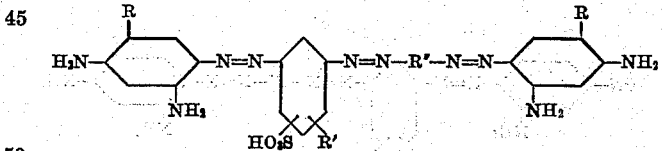

mixture. The volume of the reaction mixture should be about 5000 parts. When the coupling is complete, 250 parts of caustic soda is added and the mixture boiled for one-half hour to split off the oxalyl group. 1500 parts of common salt are immediately added to the reaction mixture, and it is then immedately cooled to about 50° C. and the precipitated monazo dye is filtered off and pressed. The precipitated monazo dye is dissolved in 1000 parts water with the aid of sodium carbonate, and 28 parts of sodium nitrite is added to the iced solution. The mixture is added to 133 parts of hydrochloric acid, sp. gr. 1.16, to which ice and water have been added. The tetrazotization is carried to completion at 0° to 5° C., and is then added to 38.4 parts of m-phenylenediamine in 500 parts water containing sufficient sodium carbonate (about 80 parts) to maintain the reaction mixture in an alkaline state during the coupling. The volume should be about 4200 parts. When the coupling is complete, the resulting trisazo dye is salted out, filtered off, pressed and dried.

The new dyestuff thus obtained has in the free state the following probable formula:

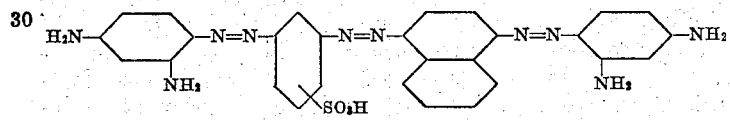

and in the dry and pulverized state in the form of its sodium salt is a brown powder soluble in water giving a brown solution, and in concentrated sulfuric acid giving a black solution. Upon reduction with stannous chloride and hydrochloric acid it is decomposed and yields 1.2.4-triaminobenzene; m-diaminobenzene sulfonic acid, and 1.4-naphthylenediamine. It dyes cotton bluish brown shades which become yellower and brighter on development on the fiber with m-toluylenediamine. The dyeings, both before and after development, are moderately fast to light and to washing.

Other new trisazo dyes are produced in an analogous manner by employing other intermediates, for example, oxalyl-m-toluylenediamine sulfonic acid in place of oxalyl-m-phenylenediamine sulfonic acid, and/or other primary amines of the benzene and naphthalene series having a free position para to the amino group and which are free from substituents except alkyl and/or alkoxy groups, for example, p-xylidine, m-toluidine, o- or m-anisidine, or cresidine, etc., in place of 1-naphthylamine. Further, in place of oxalyl-m-phenylenediamine sulfonic acid or oxalyl-m-toluylenediamine sulfonic acid there may be used the corresponding formyl or acetyl compounds.

Since certain modifications in the product which embodies the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language might be said to fall therebetween.

I claim:

1. The trisazo dyestuffs having in the free state most probably the formula:

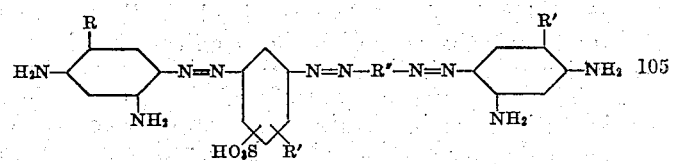

in which R and R' each denotes a hydrogen atom or an alkyl group, and R'' denotes a benzene or naphthalene nucleus which may contain alkyl and/or alkoxy groups as substituents in the nucleus but is otherwise free from substituents; said dyestuffs in the form of their sodium salts and in the dry and pulverized state being brown powders soluble in water, and which from a neutral or alkaline bath dye cotton various shades of brown which may be developed on the fibre by diazotization and treatment with a diamine of the benzene series.

2. The trisazo dyestuffs having in the free state most probably the formula:

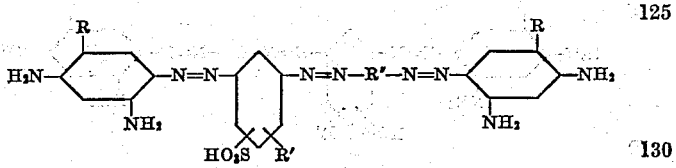

in which R and R' each denotes a hydrogen atom, $CH_3$, $C_2H_5$, $C_3H_7$, $C_4H_9$, or $C_5H_{11}$, and R'' denotes a benzene or naphthalene nucleus which may contain alkyl and/or alkoxy groups as substituents in the nucleus but is otherwise free from substituents; said dyestuffs in the form of their sodium salts and in the dry and pulverized state being brown powders soluble in water, and which from a neutral or alkaline bath dye cotton various shades of brown which may be developed on the fibre by diazotization and treatment with a diamine of the benzene series.

3. The trisazo dyestuffs having in the free state most probably the formula:

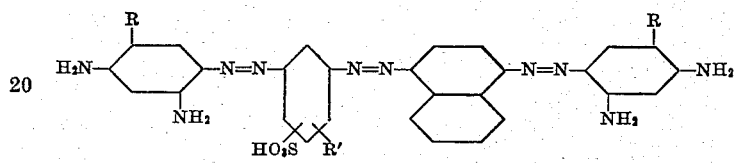

in which R and R' each denote a hydrogen atom or an alkyl group; said dyestuffs in the form of their sodium salts and in the dry and pulverized state being brown powders soluble in water, and which from a neutral or alkaline bath dye cotton various shades of brown which may be developed on the fibre by diazotization and treatment with a developing agent.

4. The trisazo dyestuff having in the free state the following probable formula:

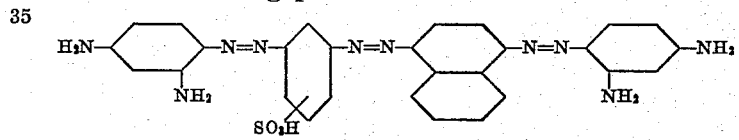

In witness whereof, I have hereunto set my hand.

RALPH B. PAYNE.